(Model.)

J. H. COMSTOCK.
NUT LOCK.

No. 321,691. Patented July 7, 1885.

WITNESSES:
Theo. G. Hoster
Ca. Sedgwick

INVENTOR:
J. H. Comstock
BY Munn & Co.
ATTORNEYS.

UNITED STATES PATENT OFFICE.

JAMES H. COMSTOCK, OF NEWPORT, RHODE ISLAND.

NUT-LOCK.

SPECIFICATION forming part of Letters Patent No. 321,691, dated July 7, 1885.

Application filed March 25, 1885. (Model.)

*To all whom it may concern:*

Be it known that I, JAMES H. COMSTOCK, of Newport, Newport county, Rhode Island, have invented a new and Improved Nut-Lock, of which the following is a full, clear, and exact description.

The invention consists in a screw-bolt having a smooth-surfaced recess or cavity in its end and a series of slits extending from the said recess to the outer surface of the bolt and from the inner end of the recess to the end of the bolt. After the nut has been screwed on the slotted end of the bolt is spread by a suitable implement to lock the nut, all as hereinafter fully described, and pointed out in the claim.

Reference is to be had to the accompanying drawings, forming part of this specification, in which similar letters of reference indicate corresponding parts in both figures.

Figure 1:
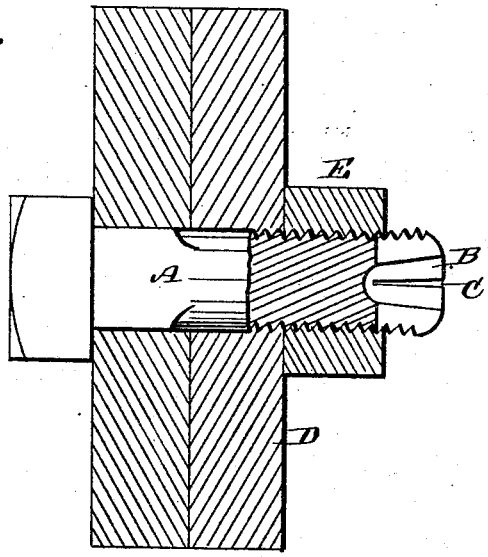
Figure 2:
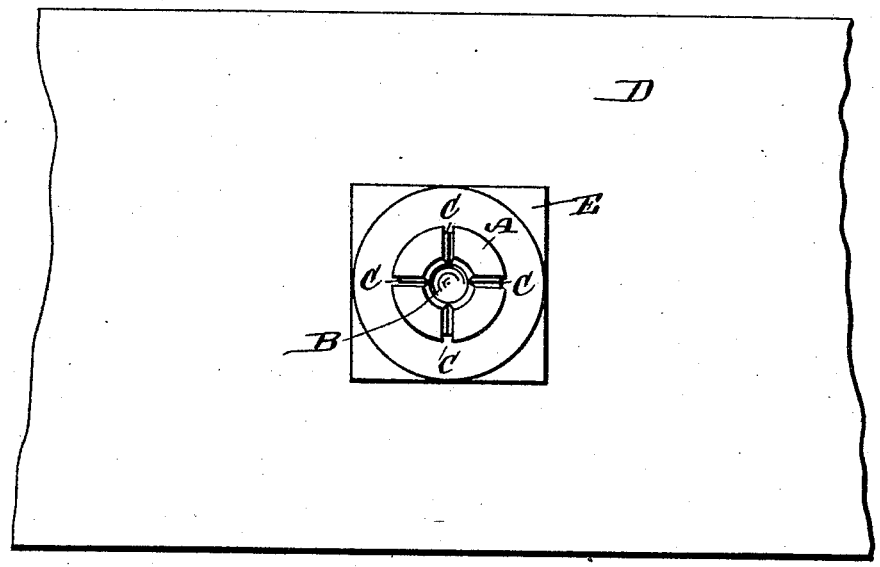

Figure 1 is a longitudinal sectional elevation of a bolt provided with my improved lock. Fig. 2 is an end view of the same.

The bolt A is provided in its end with a smooth recess or cavity, B, and with a series of radial slots, C, extending from the cavity or recess to the outer surface of the bolt and from the inner end of the cavity or recess to the outer end of the bolt. The bolt is passed through the plates D and the nut E is screwed on and drawn up tight. Then a mandrel or other implement is placed in the recess B, and a sufficient number of blows are delivered on the mandrel or other implement to cause the same to spread the slitted and apertured end of the bolt, as shown, whereby the nut is locked in place and cannot become loosened.

When very great power is applied to unscrew the nut, the prongs formed by the slits C are pressed together and the nut can be removed.

I am aware that it is not new to provide a bolt with a recess in its end to permit the expansion of the same, and I am also aware that the end of a bolt has been split, and I therefore do not claim such inventions.

Having thus described my invention, I claim as new and desire to secure by Letters Patent—

A bolt having a smooth-surfaced recess or cavity in its end and a series of radial slits extending from the inner surface of the recess or cavity to the outer surface of the bolt and from the base of the cavity to the end of the bolt, substantially as herein shown and described.

JAMES H. COMSTOCK.

Witnesses:
WM. G. WARD, JR.,
JOHN D. DENNIS.